(12) United States Patent
Barr

(10) Patent No.: US 9,637,326 B2
(45) Date of Patent: May 2, 2017

(54) TRAY SEPARATOR METHOD AND APPARATUS

(71) Applicant: Jimmy W. Barr, Springfield, OR (US)

(72) Inventor: Jimmy W. Barr, Springfield, OR (US)

( * ) Notice: Subject to any disclaimer, the term of this patent is extended or adjusted under 35 U.S.C. 154(b) by 0 days.

(21) Appl. No.: 14/545,233

(22) Filed: Apr. 10, 2015

(65) Prior Publication Data

US 2016/0297627 A1  Oct. 13, 2016

(51) Int. Cl.
*B65G 59/00* (2006.01)
*B65G 59/10* (2006.01)

(52) U.S. Cl.
CPC .................. *B65G 59/105* (2013.01)

(58) Field of Classification Search
CPC ............... B65G 59/105; B65G 59/101; B65H 2301/422; B65H 3/242; B65H 3/32
USPC ............. 221/223, 224, 251, 292, 297, 301; 271/105, 129, 166, 42; 414/795.6, 796.6, 414/797.4, 797.7, 797.9
See application file for complete search history.

(56) References Cited

U.S. PATENT DOCUMENTS

| | | | | |
|---|---|---|---|---|
| 3,206,042 | A * | 9/1965 | Peterson | B65H 3/325 271/42 |
| 3,477,592 | A * | 11/1969 | Kuhlman | B65G 59/101 221/221 |
| 3,542,243 | A * | 11/1970 | Stockdale | B65G 59/101 221/221 |
| 3,591,041 | A * | 7/1971 | DiGrande | G07F 11/22 221/11 |
| 3,672,516 | A * | 6/1972 | Nordstrand | D21B 1/06 221/16 |
| 3,701,440 | A * | 10/1972 | Windstrup | B65G 59/106 221/251 |

(Continued)

*Primary Examiner* — Gregory Adams
(74) *Attorney, Agent, or Firm* — Robert E. Howard

(57) ABSTRACT

A method and apparatus for separating a stack of trays, each tray being comprised of a plurality of spaced apart containers arranged in rows and columns and interconnected by webs located at their upper, open ends, the containers of each tray in the stack being nested within the containers of an adjacent tray, the space between the tops of adjacent containers in a row or column and the space between adjacent webs forming linear pathways through the stack. The apparatus includes a magazine for holding a stack of the trays. The magazine includes a plurality of first and second support fingers located at the first and second ends of the stack. First and second support linear actuators cause the support fingers to be extended to a stack support location during a non-separation mode of operation, and cause the support fingers to retract to a non-stack support location during the separation mode of operation. A plurality of separator fingers are positioned in alignment with opposing linear pathways formed between the lowermost tray in the stack and the tray adjacent thereto. A separator linear actuator cause the separator fingers to retract to a location out of contact with the stack during a non-separation mode of operation, and to cause the separator fingers to be substantially fully inserted into the linear pathways during a separation mode of operation. The separator fingers are configured to expand the distance between adjacent webs during insertion to cause the lowermost tray to detach from the tray adjacent thereto.

9 Claims, 4 Drawing Sheets

(56) References Cited

U.S. PATENT DOCUMENTS

| | | | | | |
|---|---|---|---|---|---|
| 3,826,348 | A | * | 7/1974 | Preisig | B65H 33/02 |
| | | | | | 198/419.1 |
| 4,396,336 | A | * | 8/1983 | Malamood | B65H 3/242 |
| | | | | | 221/251 |
| 4,457,658 | A | * | 7/1984 | Meylan | B65H 3/242 |
| | | | | | 414/795.8 |
| 4,742,937 | A | * | 5/1988 | Blom | B65G 59/105 |
| | | | | | 221/223 |
| 4,743,154 | A | * | 5/1988 | James | B23P 19/041 |
| | | | | | 198/412 |
| 4,909,412 | A | * | 3/1990 | Cerf | B65G 59/105 |
| | | | | | 221/1 |
| 5,120,191 | A | * | 6/1992 | Coddington | H05K 13/0434 |
| | | | | | 221/258 |
| 5,387,078 | A | * | 2/1995 | Todaro | B65H 3/322 |
| | | | | | 271/113 |
| 6,024,205 | A | * | 2/2000 | Adalbert | B65H 67/068 |
| | | | | | 198/345.1 |
| 7,021,887 | B2 | * | 4/2006 | Hoe | B65G 59/105 |
| | | | | | 414/796.5 |
| 2014/0234068 | A1 | * | 8/2014 | Beressey | B65G 59/105 |
| | | | | | 414/798 |
| 2014/0319163 | A1 | * | 10/2014 | Lukhaub | G01N 35/04 |
| | | | | | 221/1 |

\* cited by examiner

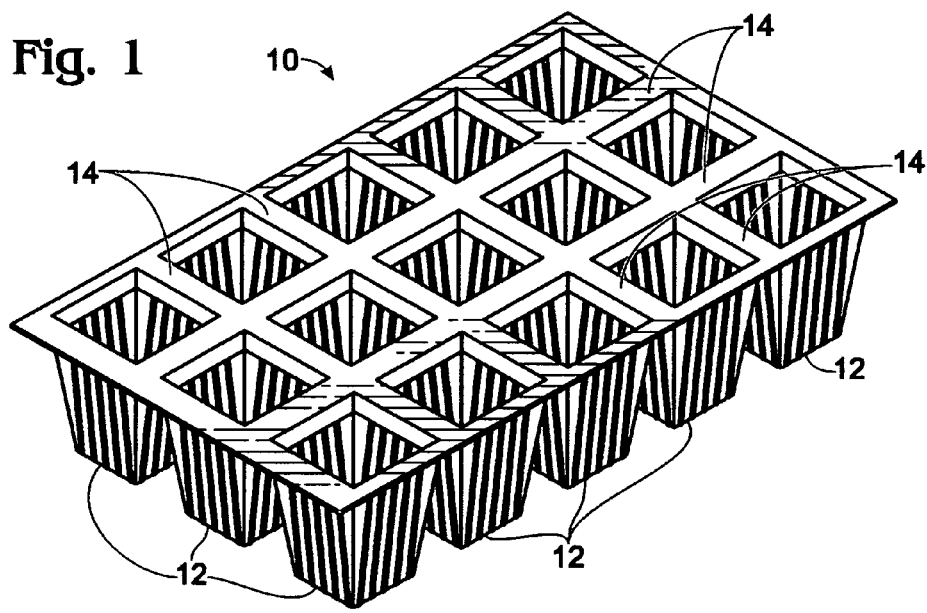
Fig. 1
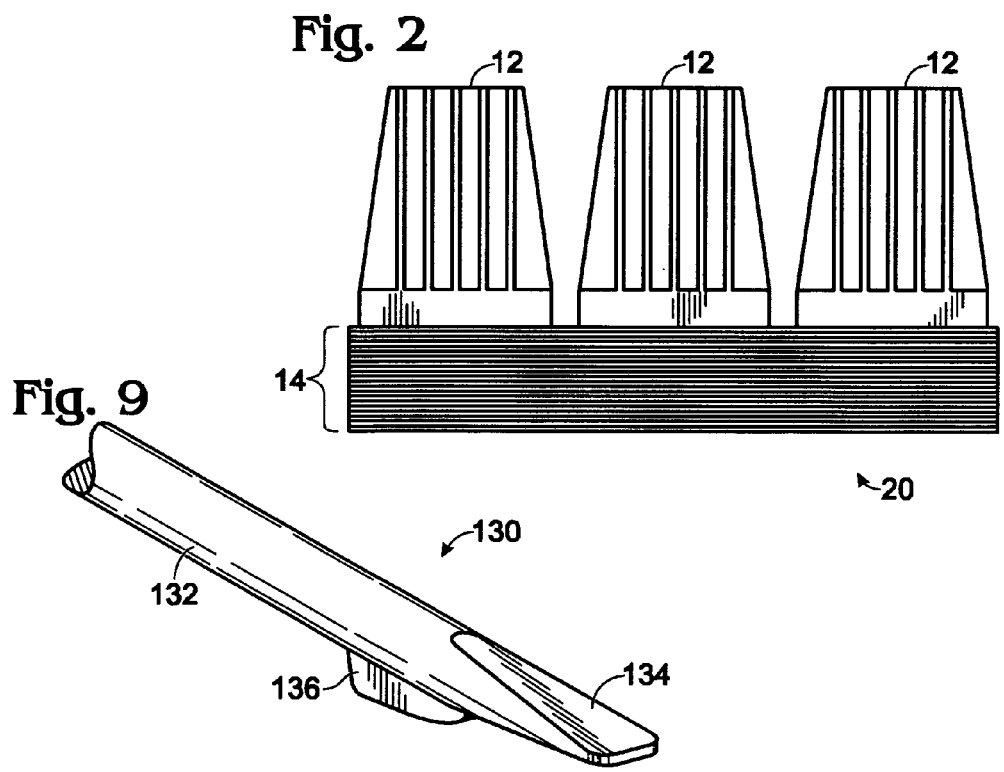
Fig. 2
Fig. 9

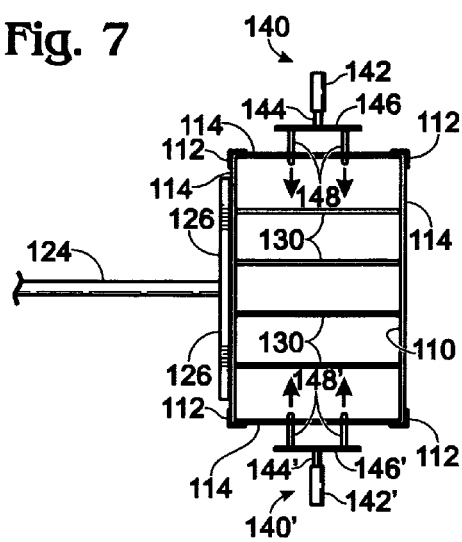
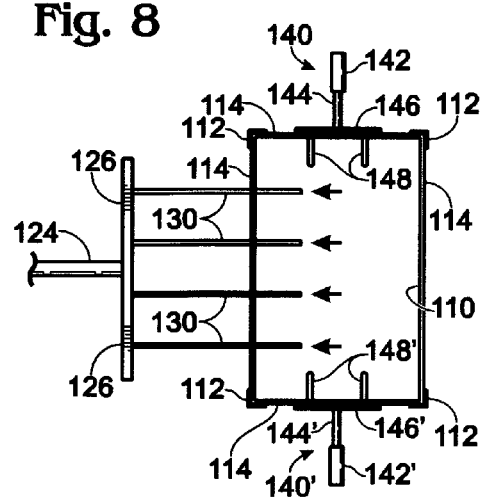
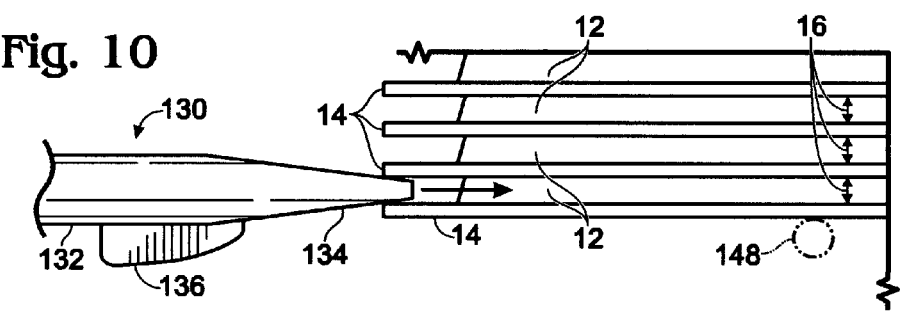
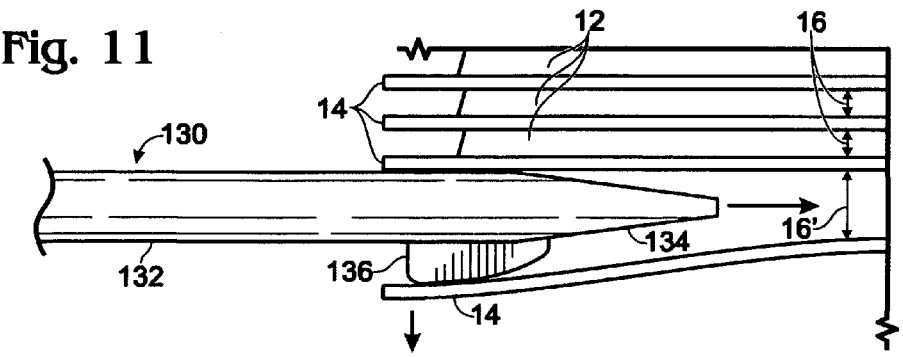

TRAY SEPARATOR METHOD AND APPARATUS

BACKGROUND OF THE INVENTION

The present invention relates to a method of separating nested trays of containers from a stack thereof, and an apparatus for carrying out the method.

Plastic containers, such as those made by injection molding high density polyethylene, are widely used for a variety of purposes, such as for holding plant cuttings and seedlings, packing berries, etc. A typical such array of containers is shown in FIG. 1 and consists of a plurality of containers joined together at their upper edges to form a tray of containers. Such trays are stacked together with the exterior of the containers of an upper tray nesting inside the containers in the tray immediately below, as seen in FIG. 2. During shipping the nested containers tend to become tightly compacted. The nursery man or berry packer must separate or "de-nest" the individual trays for use, which currently is done manually. Since the containers have thin walls, it is easy for the person attempting to separate the trays to damage some of them. Typically up to 25% of the trays are damaged during separation. The damaged trays must be discarded, leading to a large amount of wastage.

SUMMARY OF THE INVENTION

It is an object of the present invention to provide a method and apparatus for separating container trays from a stack of such trays which minimizes or eliminates damage to the trays.

The separator apparatus of the present invention for separating a stack of trays. Each tray is comprised of a plurality of spaced apart containers arranged in rows and columns and interconnected by webs located at their upper, open ends. The containers of each tray in the stack is nested within the containers of an adjacent tray. The space between the tops of adjacent containers in a row or column and the space between adjacent webs form linear pathways through the stack.

The apparatus includes a magazine for holding a stack of the trays. The magazine includes a plurality of first and second support fingers located at the first and second ends of the stack. First and second support linear actuators cause the support fingers to be extended to a stack support location during a non-separation mode of operation, and cause the support fingers to retract to a non-stack support location during the separation mode of operation.

A plurality of separator fingers are positioned in alignment with opposing linear pathways formed between the lowermost tray in the stack and the tray adjacent thereto. A separator linear actuator cause the separator fingers to retract to a location out of contact with the stack during a non-separation mode of operation, and to cause the separator fingers to be substantially fully inserted into the linear pathways during a separation mode of operation. The separator fingers are configured to expand the distance between adjacent webs during insertion to cause the lowermost tray to detach from the tray adjacent thereto.

BRIEF DESCRIPTION OF THE DRAWINGS

FIG. 1 is an isometric view of a single tray of a plurality of containers;

FIG. 2 is an elevation view of an inverted stack of a plurality of such trays;

FIG. 7 is a top view of a portion of the tray separator apparatus shown after complete insertion of the separator fingers and prior to extension of the support fingers;

FIG. 8 is a top view of a portion of the tray separator apparatus showing retraction of the separator fingers and full extension of the support fingers;

FIG. 9 is an isometric view of the distal end of a separator finger;

FIG. 10 is a side elevation, partial detail of a separator finger beginning to enter between the lowermost container tray and the adjacent container tray, with a support finger shown in phantom; and FIG. 11 is a side elevation partial detail of a separator finger more fully inserted between the lowermost and adjacent container trays.

DESCRIPTION OF PREFERRED EMBODIMENTS

Figure 3:
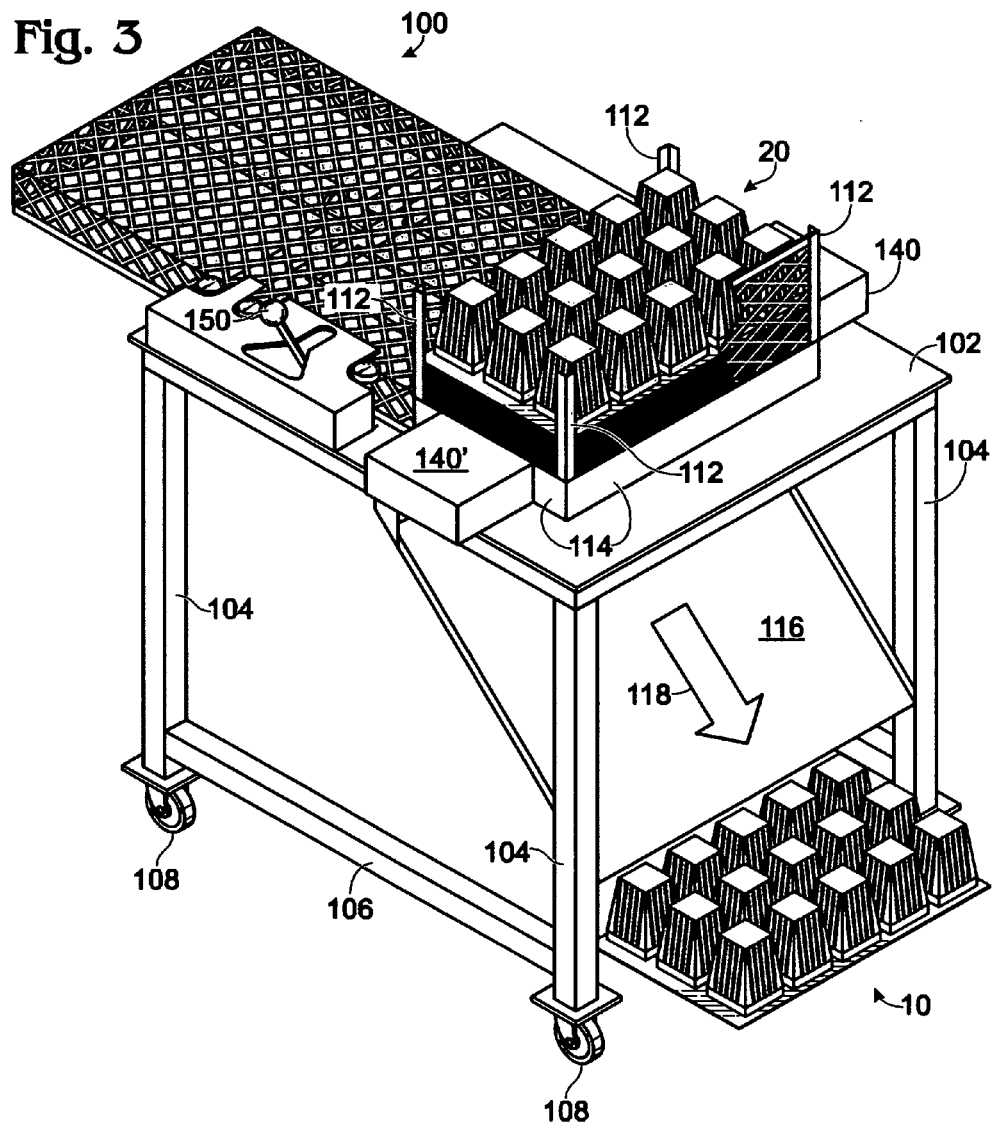
FIG. 3 is an isometric view of the tray separator apparatus of the present invention.

FIG. 1 shows a rectangular container tray 10 consisting of a plurality of interconnected containers 12 arranged in rows and columns. Tray 10 is formed by any suitable plastic forming process, such as injection molding. Each container 12 is connected to adjacent containers 12 at their upper edges by webs 14.

For purposes of illustration tray 10 is shown containing three rows of five containers, or five columns of three containers, for a total of fifteen containers per tray. However, the separator method and apparatus of the present invention may be used with container trays containing a different number of containers so long as they are arranged in rows and columns with space in between forming linear pathways.

As seen in FIG. 2, a plurality of container trays 10 are nested together to form a stack 20 for shipment to a customer. For purposes of illustration, stack 20 is shown as containing twenty-one nested container trays 10. Although the containers 12 of one tray are nested within the containers 12 of an adjacent tray, there is a small space between adjacent webs 14, as shown by spacing arrows 16 in FIG. 10 as well as a small space between the tops of adjacent containers 12. The space between adjacent webs 14 and between the tops of adjacent containers 12 form linear pathways through stack 20.

An overall view of the tray separator apparatus 100 of the present invention is shown in FIG. 3. Tray separator 100 has a horizontal table top 102 attached to a plurality of vertical legs 104 and stabilizing cross-members 106, only one of which is shown in FIG. 3. Legs 104 may have wheels 108 attached to their lower ends to allow for easy movement of tray separator 100.

Table top 102 has a rectangular opening 110 located at the rearward end thereof, as best seen in FIGS. 5-8. Rectangular opening 110 has a length and width that is slightly larger than the length and width of tray 10. Vertically disposed tray support members 112 extend upwardly from the corners of opening 110 a distance adapted to hold an inverted stack 20 of trays 10. Tray support members 112 are L-shaped in cross-section, and together with bottom cross-members 114 form a stack feed magazine adapted to receive a stack 20 of trays 10.

A chute 116 is located below opening 110 to deliver a separated tray 10 away from separator apparatus 100 in the direction shown by arrow 118 in FIG. 3.

Figure 4:
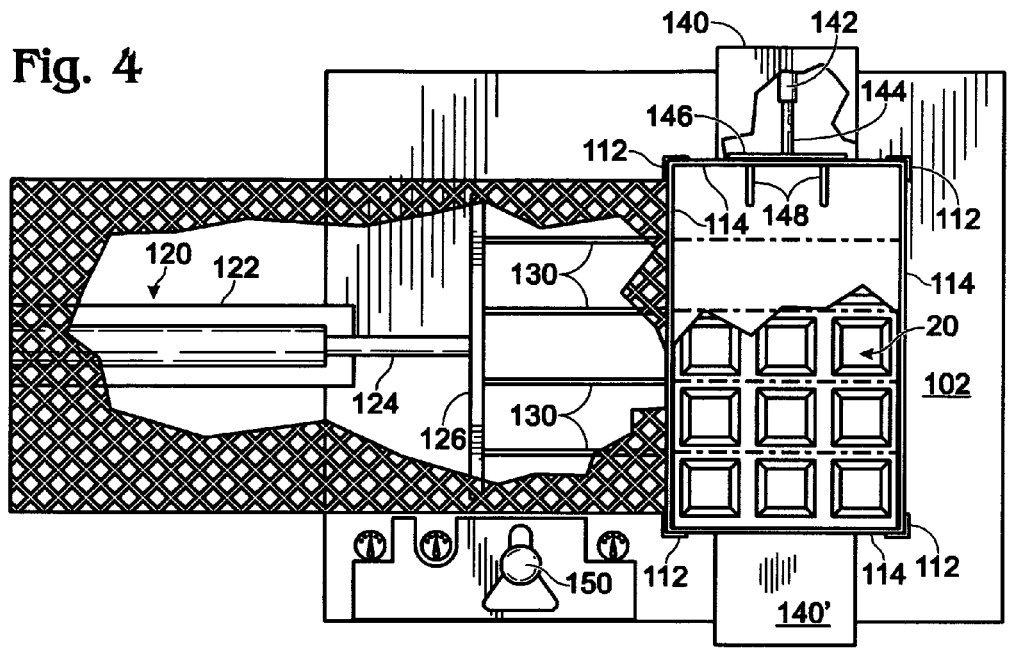
FIG. 4 is a top plan view of the tray separator apparatus.

As seen in FIG. 4, a separator pneumatic linear actuator 120 comprising cylinder 122 and piston 124 is located at the forward end of table top 102 with the longitudinal axis thereof being substantially perpendicular to the forward edge of opening 110 and substantially at the midpoint thereof. Although a pneumatic linear actuator is preferred, a hydraulic linear actuator other linear actuator could be employed. A horizontally disposed separator finger holder bar 126 is perpendicularly attached to the outer end of piston 124. The proximal ends of a plurality of separator fingers 130 are perpendicularly attached to holder bar 126 and extend substantially to the forward edge of opening 110 when piston 124 is in its fully retracted configuration. The number of separator fingers 130 are equal to the number of openings between containers 12 in tray 10 facing separator fingers 128 which, the case of tray 10 illustrated in FIG. 1, would be four openings resulting in the use of four fingers.

An enlarged view of the distal end of a single separator finger 130 is shown in FIG. 9, all of the separator fingers 130 having identical configurations. The rearward portion 132 of finger 130 is substantially circular in cross-section. The upper and lower surfaces of the outer tip of separator finger 130 located at the distal end thereof are flattened and slope downwardly toward the tip to form a wedge portion 134. A spreader fin 136 extends downwardly from the bottom of separator finger 130 with its forward end being adjacent the rearward end of wedge portion 134. Spreader fin 136 is higher at its rearward end than at its forward end, i.e., slopes downwardly from front to rear.

Wedge portion 134 is of a size and shape that allows insertion into the space formed between adjacent containers 12 in the rows of containers of lowermost tray 10 of stack 20 and the space 16 formed between webs 14 of lowermost tray 10 and the webs 14 of the tray adjacent thereto; see FIG. 10. The spaces formed between adjacent containers 12 in the rows of containers of lowermost tray 10 of stack 20 and the spaces 16 formed between webs 14 of lowermost tray 10 and the webs 14 of the tray adjacent thereto form linear pathways through stack 20. The height of each linear pathway is the distance between web 14 of the lowermost tray 10 and the web of the tray adjacent thereto, and the width of each linear pathway is the distance between adjacent containers in the lowermost tray.

A first stack support pneumatic linear actuator 140 comprising cylinder 142 and piston 144 is located adjacent the left side of opening 110 with the longitudinal axis thereof being perpendicular thereto. A horizontally disposed stack support finger holder bar 146 is perpendicularly attached to the outer end of piston 144. The proximal ends of a plurality of stack support fingers 148 are perpendicularly attached to holder bar 146 and extend inwardly a distance into opening 110 adapted to support the left end of a stack 20 of trays 10 placed in the stack holder magazine when piston 144 is in its fully extended configuration. The number of support fingers 148 are equal to the number of openings between containers 12 in tray 10 facing support fingers 148 which, the case of tray 10 illustrated in FIG. 1, would be two openings resulting in the use of two fingers. Stack support fingers 148 are preferably circular in cross-section, but can be of any size and shape adapted to support one end of a stack 20 of trays.

A second stack support pneumatic linear actuator 140' is located adjacent the right side of opening 110, and is identical to first actuator 140. FIGS. 5-8 show the components of stack support pneumatic linear actuator 140'. Stack support pneumatic linear actuator 140' is comprised of cylinder 142' and piston 144', and is located adjacent the right side of opening 110 with the longitudinal axis thereof being perpendicular thereto. A horizontally disposed stack support finger holder bar 146' is perpendicularly attached to the outer end of piston 144'. The proximal ends of a plurality of stack support fingers 148' are perpendicularly attached to holder bar 146' and extend outwardly into opening 110 a distance adapted to support the right end of a stack 20 of trays 10 placed in the stack holder magazine when piston 144' is in its fully extended configuration. The number of support fingers 148' are equal to the number of openings between containers 12 in tray 10 facing support fingers 148' which, the case of tray 10 illustrated in FIG. 1, would be two openings resulting in the use of two fingers. Stack support fingers 148 are preferably circular in cross-section, but can be of any size and shape adapted to support one end of a stack 20 of trays.

Figure 5:
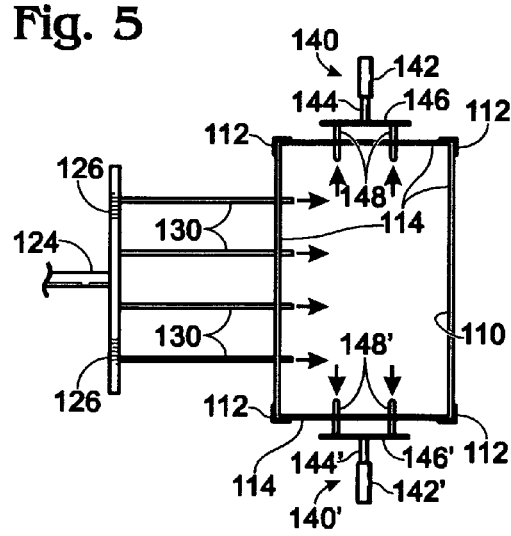
FIG. 5 is a top view of a portion of the tray separator apparatus shown prior to insertion of the separator fingers and prior to retraction of the support fingers.
Figure 6:
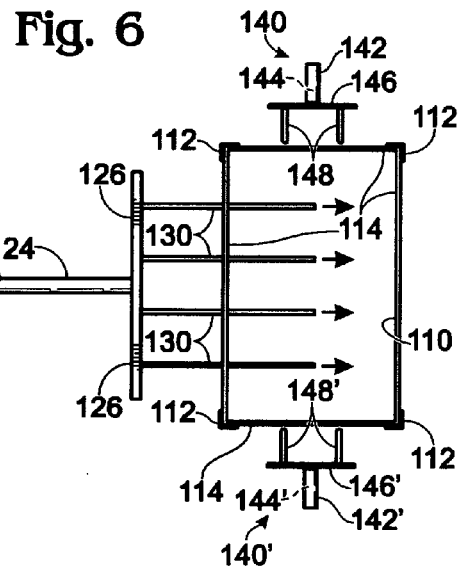
FIG. 6 is a top view of a portion of the tray separator apparatus shown after partial insertion of the separator fingers and after retraction of the support fingers.

First and second stack support pneumatic linear actuators 140, 140' act in synchronization, i.e., they advance and retract support fingers 148 and 148' at the same time. Although pneumatic linear actuators are preferred, hydraulic linear actuators other linear actuators could be employed Separator pneumatic linear actuator 120 and stack support pneumatic linear actuators 140 and 140' are connected to a compressed air source (not shown) via a valve 150 and conduits (not shown) extending between valve 150 and actuators 120, 140, and 140'. In a first, non-separation mode, separator pneumatic piston 124 and separator fingers 130 are in their fully retracted position, and the pistons 144, 144' and support fingers 148, 148' of stack support pneumatic linear actors 140 and 140' are in their fully extended position, as shown in FIG. 4. Upon placing valve 150 into separation mode, separator pneumatic linear actuator 120 extends separator fingers 130 outwardly and support pneumatic linear actuators 140, 140' retracts stack support fingers 148, 148', as shown in FIGS. 5 and 6. After separation of the lowermost tray 10 in stack 20, valve 150 is placed into its non-separation mode which retracts separator fingers 130 inwardly and extends support fingers 148, 148' outwardly, as shown in FIGS. 7 and 8. The cycle is repeated until all of the trays 10 in stack 20 have been separated.

In operation, a stack 20 of trays 10 are inverted and placed into the stack feed magazine of separator apparatus 100, as seen in FIGS. 1 and 4. Stack 20 is supported over opening 110 by support fingers 148, 148'. Valve 150 is placed into separation mode causing separator fingers 130 to be advanced towards the opposing linear pathways located between the lowermost tray 10 and the tray adjacent thereto. Wedge portion 132 located at the outer end of each separator finger 130 penetrates its opposing linear pathway, entering space 16 between the webs 14 of the lowermost tray 10 in stack 20 and the webs 14 of the tray adjacent thereto. As separator finger 130 penetrates deeper into the space 16, wedge portion 132 pushes adjacent webs 14 apart and allows spreader fin 134 to enter an enlarged space 16 and push the adjacent webs 14 farther apart, as shown by space 16' in FIG. 11. Upon complete insertion of separator finger 130 into space 16, the lowermost tray 10 is completely separated or detached from stack 20 and drops down chute 116 in the direction of arrow 118, as shown in FIG. 3. The separated tray 10 can be manually removed, or dropped onto a conveyor belt (not shown) for removal downstream.

Valve 150 is then placed into non-separation mode, and separator fingers 130 are retracted and support fingers 148 and 148' are extended to provide support for the remaining trays 10 in stack 20. The cycle is then repeated until all of the trays 10 have been separated from stack 20.

Valve 150 has been described as being manually operated. However, it could be operated by a computer to provide automatic cycling between separation and non-separation configurations.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A separator apparatus for separating a stack of trays, each tray being comprised of a plurality of spaced apart containers arranged in rows and columns and interconnected by webs located at their upper, open ends, the containers of each tray in said stack being nested within the containers of an adjacent tray, the space between the tops of adjacent containers in a row or column and the space between adjacent webs forming linear pathways through said stack, comprising:

a magazine for holding a stack of said trays, said magazine including a plurality of first support fingers located at a first end of said stack, a plurality of second support fingers located at the second end of said stack, said first and second support fingers being attached to first and second support linear actuators, respectively, and means for causing said first and second support linear actuators to extend said first and second support fingers to a stack support location and to cause said support fingers to retract to a non-stack support location; and a plurality of separator fingers positioned in alignment with opposing linear pathways formed between the lowermost tray in said stack and the tray adjacent thereto, each of said separator fingers configured to have a distal end having upper and lower surfaces forming a vertically disposed wedge portion at the tip thereof and a spreader member having forward and rearward ends extending downwardly from said lower surface of said wedge portion, said spreader member sloping downwardly from its forward end facing the tip of said separator finger to its rearward end facing the proximal end of said separator finger, each of said separator fingers having a proximal end attached to a separator linear actuator having means for causing said support fingers to retract to a location out of contact with said stack and to cause said support fingers to extend to a location where said separator fingers are substantially fully inserted into said linear pathways, said configuration of said separator fingers and said spreader member causing the distance between adjacent webs forming said linear pathways through said stack to expand as they advance into substantially full insertion to thereby cause said lowermost tray of said stack to detach from said tray adjacent thereto.

2. The separator apparatus of claim 1 wherein said spreader member is comprised of at least one spreader fin extending from said separator finger.

3. The separator apparatus of claim 1 wherein said spreader member is configured to contact at least one of said webs forming said linear pathways.

4. The separator apparatus of claim 3 wherein said spreader member is configured to contact the underside of the web of said lowermost tray in said stack.

5. The separator apparatus of claim 1 wherein said magazine is attached to a substantially flat surface, said surface having an opening located below said magazine of a size that allows said lowermost tray separated from the bottom of said stack to pass there through.

6. The separator apparatus of claim 5 wherein conveying means for conveying said separated lowermost tray away from said apparatus is located below said opening.

7. The separator apparatus of claim 6 wherein conveying means includes a chute.

8. The separator apparatus of claim 1 wherein said separator linear actuator and said support linear actuators are pneumatic linear actuators.

9. A process for separating trays from a stack of trays, each tray being comprised of a plurality of spaced apart containers arranged in rows and columns and interconnected by webs located at their upper, open ends, the containers of each tray in said stack being nested within the containers of an adjacent tray, the space between the tops of adjacent containers in a row or column and the space between adjacent webs forming linear pathways through said stack, comprising:

providing a stack of said trays;

providing a plurality of separator fingers positioned in alignment with opposing linear pathways formed between the lowermost tray in said stack and the tray adjacent thereto;

each of said separator fingers configured to have a distal end having upper and lower surfaces forming a vertically disposed wedge portion at the tip thereof and a spreader member having forward and rearward ends extending downwardly from said lower surface of said wedge portion, said spreader member sloping downwardly from its forward end facing the tip of said separator finger to its rearward end facing the proximal end of said separator finger; and causing said separator fingers to extend to a location where said separator fingers are substantially fully inserted into said linear pathways, said separator fingers being and said spreader member configured to expand the distance between adjacent webs and to cause said lowermost tray to detach from said tray adjacent thereto; and retracting said separator fingers.

* * * * *